US008285403B2

(12) United States Patent
Salvatore et al.

(10) Patent No.: US 8,285,403 B2
(45) Date of Patent: Oct. 9, 2012

(54) MOBILE TRANSCODING ARCHITECTURE

(75) Inventors: Sergio Salvatore, Union City, NJ (US);
Naveen Selvadurai, New York, NY (US); Tim Nilson, New York, NY (US)

(73) Assignees: Sony Corporation, Tokyo (JP); Sony Music Entertainment Inc., New York, NY (US)

( * ) Notice: Subject to any disclaimer, the term of this patent is extended or adjusted under 35 U.S.C. 154(b) by 1891 days.

(21) Appl. No.: 10/978,931

(22) Filed: Nov. 1, 2004

(65) Prior Publication Data

US 2005/0197108 A1 Sep. 8, 2005

Related U.S. Application Data

(60) Provisional application No. 60/550,787, filed on Mar. 4, 2004.

(51) Int. Cl.
*G06F 17/00* (2006.01)
*G06F 9/44* (2006.01)
*H04H 40/00* (2008.01)

(52) U.S. Cl. .......................... 700/94; 717/115; 455/3.06

(58) Field of Classification Search .................... 700/94; 717/115; 455/3.06
See application file for complete search history.

(56) References Cited

U.S. PATENT DOCUMENTS

| 5,418,713 | A * | 5/1995 | Allen | 705/32 |
| 7,149,693 | B2 * | 12/2006 | Laronne et al. | 704/270 |
| 7,426,329 | B2 * | 9/2008 | Calhoon et al. | 386/46 |
| 7,522,675 | B2 * | 4/2009 | Sheynman et al. | 375/295 |
| 2002/0138852 | A1 * | 9/2002 | Reynolds et al. | 725/136 |
| 2003/0105778 | A1 * | 6/2003 | Andani | 707/200 |
| 2003/0110297 | A1 * | 6/2003 | Tabatabai et al. | 709/246 |
| 2003/0153265 | A1 * | 8/2003 | Hunt | 455/3.06 |
| 2003/0167334 | A1 * | 9/2003 | Butler | 709/227 |

* cited by examiner

*Primary Examiner* — Davetta W Goins
*Assistant Examiner* — Daniel Sellers
(74) *Attorney, Agent, or Firm* — Mark D. Wieczorek, Esq.; Karin L. Williams, Esq.; Mayer & Williams PC

(57) ABSTRACT

A method and system for transcoding for a mobile device. The method includes accepting a master file, processing the master file with steps laid out in a definition file, the definition file providing instructions for converting the master file to a derivative file appropriate for playback on a pre-specified mobile handset, and outputting the results of the processing step into the derivative file. The system includes a definition file, the definition file providing instructions for converting a master file to a derivative file appropriate for playback on a pre-specified mobile handset. A plurality of modules is employed that are controlled by the definition file and which perform a corresponding plurality of functions on the master file or derivatives thereof. The function or processing steps may include one or more or all of the following: channel averaging, equalization, dynamic compression, limiting and peak normalization, resampling, CODEC encoding, applying a wrapper, or applying digital rights management.

28 Claims, 3 Drawing Sheets

```
</Transcoder>
    <meta>
        <extension>qcp</extension>
        <mimeType>audio/vnd.qcelp</mimeType>
    </meta>
    <action>
        <AudioTranscoder>
            <SplicingBlock>                    ⌐105
                <maxLength>15</maxLength>
            </SplicingBlock>
            <Mixer>
                <channels>1</channels>
                <eq>                           ⌐124
                    <lowCut>1000</lowCut>
                    <highCut>4000</highCut>
                </eq>                          ⌐122
            </Mixer>

<AdaptiveCompressor/>          ⎫
                                           ⎬ 111
            <Pcm>                          ⎭
                <bitDepth>16</bitDepth>
                <rate>8000</rate>
            </Pcm>
            <Qcelp/>  ⌐115
        </AudioTranscoder>
    </action>
</Transcoder>
```

*FIG. 3*

MOBILE TRANSCODING ARCHITECTURE

RELATED APPLICATIONS

This application claims priority to U.S. Provisional Patent Application Ser. No. 60/550,787, filed Mar. 4, 2004, entitled "Mobile Transcoding Architecture", and hereby incorporates by reference that application in its entirety.

BACKGROUND OF THE INVENTION

The mobile media business is laden with numerous proprietary formats, for multiple types of media, and a variety of arbitrary restrictions on what type and format of media can be delivered to a given mobile handset. These restrictions are often based on the network over which the handset communicates, its local storage limitations and/or internal processing limitations. With this in mind, creating an efficient system for delivering mobile content is especially challenging, yet extremely desirable. Because nearly every device has a specific set of requirements, the production of media for a set of devices can quickly become unwieldy, yielding tens of thousands of files that are logically equivalent and only slightly different so they conform to the different handset/carrier-specific restrictions or requirements. Managing the sheer number of files manually is too complicated and is a task better-suited to a well-designed system.

SUMMARY OF THE INVENTION

In one aspect, the invention is directed towards a method and system for transcoding for a mobile device. The method includes steps of accepting a master file, processing the master file with steps laid out in a definition file, the definition file providing instructions for converting the master file to a derivative file appropriate for playback on a pre-specified mobile handset, and outputting the results of the processing step into the derivative file. The system includes a definition file, the definition file providing instructions for converting a master file to a derivative file appropriate for playback on a pre-specified mobile handset. A plurality of modules is employed that are controlled by the definition file and which perform a corresponding plurality of functions on the master file or derivatives thereof. The function or processing steps may include one or more or all of the following: channel averaging, equalization, dynamic compression, limiting and peak normalization, resampling, CODEC encoding, applying a wrapper, applying digital rights management.

BRIEF DESCRIPTION OF THE DRAWINGS

FIG. 3 shows a sample definition file for an audio transcoding operation.

DETAILED DESCRIPTION

The term "transcoding" refers to the process of converting a file from one format to another. It is often used to describe the process of transforming a media file in such a way that it may be played on several different types of devices, especially mobile devices.

Transcoding can be categorized based on the type of content that is delivered. Typically these are audio, graphics, and video. Each content type typically requires a special processing method by which an optimal file is created for playback on a mobile device.

Figure 1:
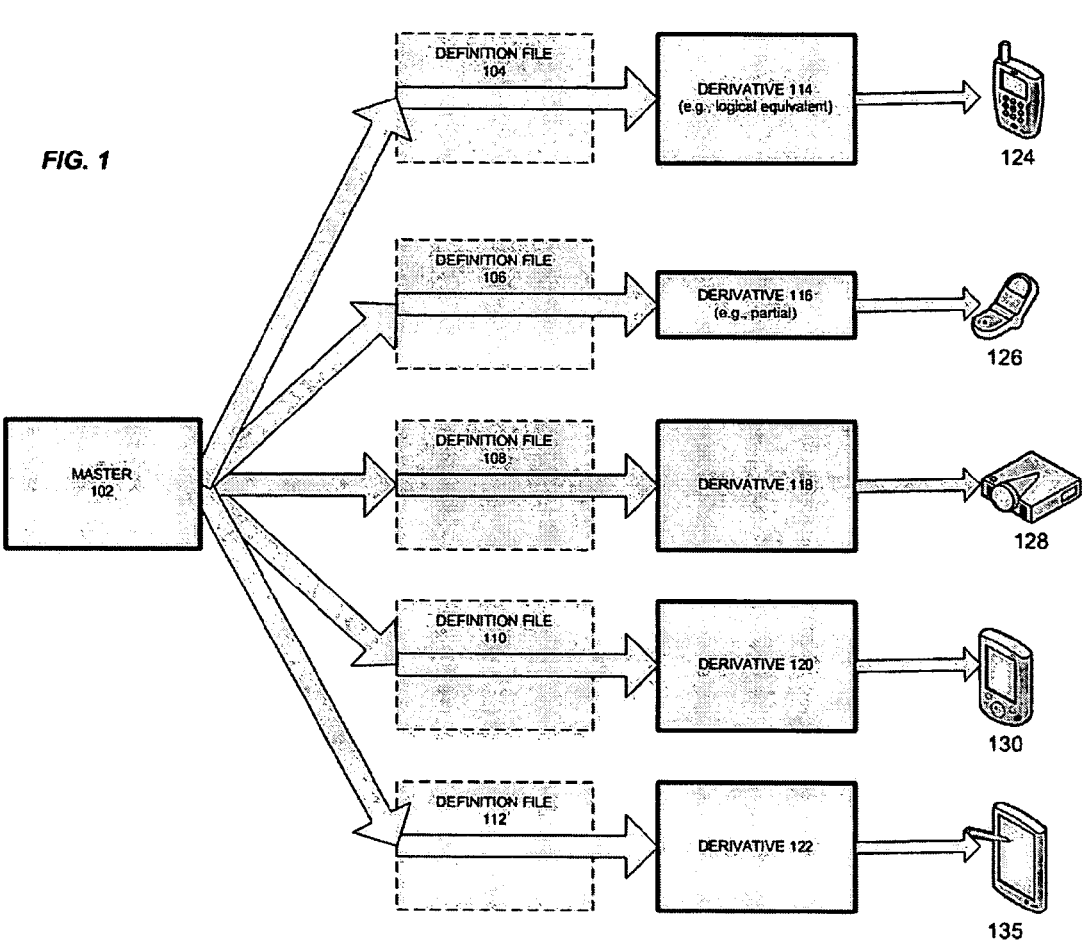
FIG. 1 shows a schematic depiction of an embodiment of the invention.

A "master-derivative" approach is employed in the transcoding of the current invention. Referring to FIG. 1, a master file 102 may be converted into a number of derivative files 114-122 via use of a set of corresponding definition files 104-112. Each derivative file 114-122 is derived from the master file 102, and each provides a different representation of the master file 102, as would be required to accommodate the different input parameters of a set of different mobile devices 124-132.

In some cases, the master and its derivatives are logical equivalents. This is shown in FIG. 1 by the master 102 and the derivative 114. These contain the same content, but are expressed in different formats.

In other cases, a derivative may contain only a portion of the content of the master. This is shown in FIG. 1 by the master 102 and the derivative 116. In this case, the definition file determines a subset of data to be used in producing the derivative 116. Of course, this does not necessarily mean that the derivative is a smaller file. It may be larger or smaller depending on the definition file (explained in more detail below). For example, in a graphics file of a photograph, the derivative may be a lower-resolution photo but may be enlarged in size, resulting in, in some cases, a larger file size. Generally, the content included in the derivative may be defined by a user of the system, or may be calculated by the system itself based on a number of conditions.

A master file such as master 102 employed in the current invention has several required and optional characteristics. First, a master is type-specific. For example, for audio files, the master would always be a type of audio file, e.g., .wav, .mp3, .cda, etc. For graphics, the master would be a type of graphics file, e.g., .jpg, .bmp, tif, etc. In virtually all cases, the master is the highest-quality file that is practical to use in order to best support the widest variety of derivatives which may be desired to be produced, from poor derivations to high-quality ones.

Figure 2:
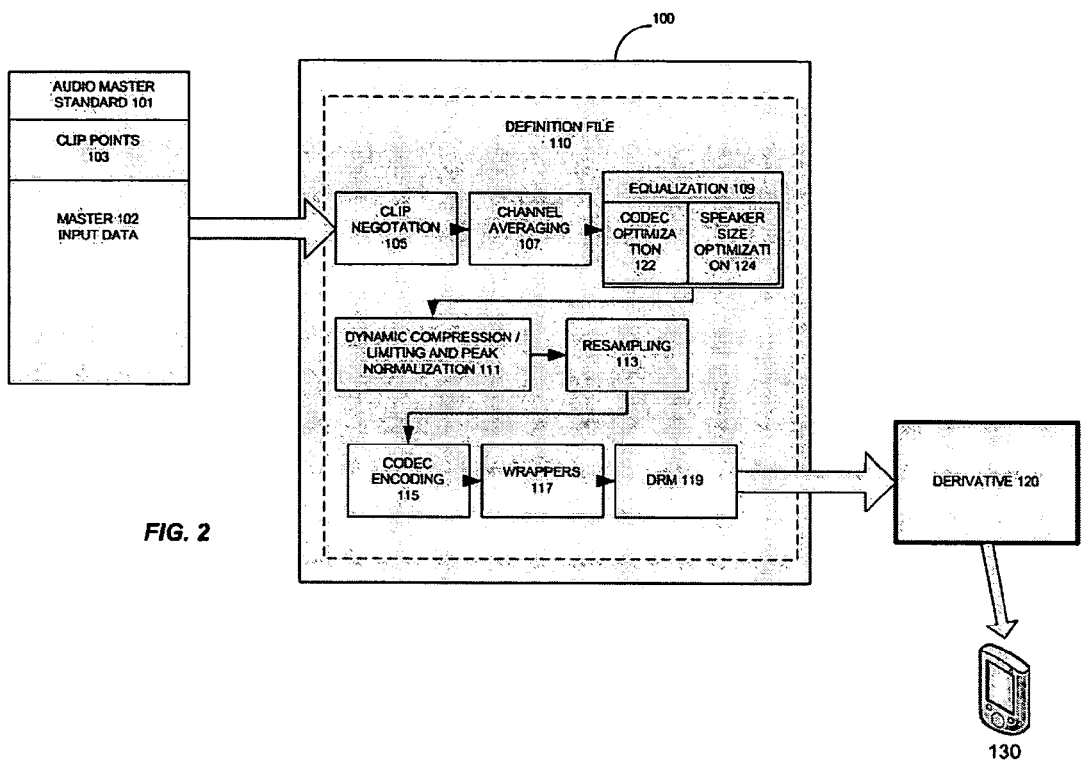
FIG. 2 shows a schematic depiction of an embodiment of the invention for audio transcoding.

Referring also to FIG. 2, a derivative file such as derivative 116 is defined by, and created via, a definition file 110, mentioned above, which informs the system 100, which may include a microprocessor 120, of the steps necessary to create the derivative from the master. The definition file is employed by the system during the transcoding process and can be viewed as a recipe which describes the process of creation of the derivative. A definition file is partially universal and partially type-specific.

For example, a definition file provides certain base-level information that includes the resultant file's extension and MIME type. As an example, a CD-audio type file file.cda may be a master, and an mp3 file may be desired to be the derivative. The definition file would contain information about how to create mp3 files, as well as information regarding the naming of the resultant file as file.mp3. The MIME type content in the definition file refers to whether the file is of type text, multipart, application, image, audio, video, etc.

As noted, a definition file also contains information that is partially type-specific. For example, definition files intended for audio transcoding could include a section that describes how to apply equalization to the audio master to result in the audio derivative file. Analogously, definition files meant for graphics transcoding could include a section that describes the characteristics of the color palette.

EXAMPLE 1

Audio Transcoding

An embodiment of the invention will now be described with respect to a portion of FIG. 1, i.e., master 102, definition file 110, and derivative 120. It should be clear to one of ordinary skill in the art that, given the teaching of this disclosure, extension to analogous systems may be performed. Master 102, definition file 110, and derivative 120 may related to an audio transcoding system. Certain aspects inure particularly to audio transcoding.

In many mobile handsets, the audio CODEC, i.e., the hardware that takes data, compresses it for storage, and then decompresses it for usage, was designed solely for voice use and not for music. Another drawback is that mobile devices typically employ small speakers, such as 5-15 mm devices, that encounter difficulty in reproducing low frequencies accurately. Additionally, there are size restrictions for audio content on mobile devices due to memory limitations. It is desirable to maximize the amount of content of mobile media that may be included in order to get the best performance from the mobile device.

The transcoding system 100 expects a certain set of input data. First, system 100 expects the input data to employ a particular audio format 101, e.g., a full-length 2-channel (stereo) .wav file encoded at 16 bits, 44.1 kHz. For example, this may be a copy of a song that resided on a compact disc. The audio format may vary, and there is no restriction on its source. However, the format should remain the same for any one version of the system.

Next, the transcoding system 100 may employ a number of clip points 103. Clip points 103 define when a clip starts and when a clip ends. In the production process, clip points are defined by the producer, and there may be any number of them. Clip points may be defined by the producer to indicate optimal sections of the file that should be used when clipping. They are stored externally to the actual audio file as integers representing the sample numbers (where there are, in the example above, 44,100 samples per second) of their start and end points to provide the highest-possible accuracy. In order to cover the wide variety of mobile handsets, such clips may be created in various arbitrary lengths. For example, clips may range in length from approximately 6 seconds to 30 seconds. The use of clip points is optional. If no clip points are employed, the system 100 may, e.g., simply begin transcoding at the beginning of the file, or may alternatively use another technique to determine where to start.

One way of defining clip points is by use of software such as SOUNDFORGE by Sonic Foundry. Generally, however, the choice of where to locate clip points is on the basis of artistic value of the clip region.

The definition file 110 in an audio transcoding system 100 may specify a number of parameters, and may further provide methods to modify the input master file 102 so that the parameters are achieved. The parameters may include levels for equalization, dynamic compression processes, CODEC operations, resampling operations, and/or clipping operations. These are discussed in more detail below. Not all are required to occur; indeed, in some cases, none will occur.

A clip negotiation module 105 may be employed to determine which, if any, predefined clips are to be used in the derivative 120. A process run in the clip negotiation module 105 may be subject to certain parameters. For example, in one embodiment, the clip negotiation module 105 can take two parameters: the maximum clip length and the maximum deviation from the maximum clip length. The first is generally required and the second is generally optional. The maximum clip length determines the absolute maximum length of the derivative file. The maximum deviation defines, as a percentage, how different the length of the resultant file can be from the maximum length.

For example, if a producer has defined clip lengths for a given audio master that result in clips that are 6, 11, and 15 seconds long, and the definition file defines the maximum length of the file to be 23 seconds, then the clip negotiation module 105 attempts to find the best clip given the clip points. The longest clip that is less than or equal to the maximum clip length is, in this case, 15 seconds. The deviation of that length from the maximum length is defined as (1−targetClipLength/maxClipLength)=(1−(15/23))=34.78%. If the maximum deviation is greater than 34.78%, the 15-second clip points are selected. Alternatively, if the maximum deviation is less than 34.78%, then the clip start point is used from the 15-second clip, but the end point is calculated to be 23 seconds from the start point. The maximum deviation may have a default, e.g., 33% if no parameter is specified in the deviation file. Other definitions are within the scope of the current invention, although the principle would be the same.

A channel averaging module 107 may also be employed. In current handsets, typically only mono-audio files, i.e., 1-channel files, are supported. The channel averaging module 107 mixes and averages the left and right channels of the master file 102, which is usually in a stereo format, to create a mono-audio file. This step may be accomplished in a number of ways, many of them standard.

An equalization module 109 may be employed to apply the specialized equalization required in some audio files. In particular, specialized equalization needs to be applied to properly optimize the derivative for the mobile CODEC as well as for the speaker on the device. Knowledge of the final CODEC is essential in determining the proper equalization setting. For example, many CODECs have maximum sampling rates of 8 kHz, which has a consequence that the highest frequency that is reproducible is 4 kHz due to the Nyquist theorem. Thus, CODEC equalization 122 may be applied to roll off frequencies above 4 kHz in order to consolidate the frequencies of the input in the next stages of the transcoding process.

Moreover, the speakers on mobile handsets are typically quite small, and can rarely produce frequencies below 1 kHz. The exact lower limit depends on the size and geometry of the speaker. For analogous reasons as the high-frequency roll-off above, a low cut speaker size equalization 124 may be employed to filter out frequencies that are less reproducible on small speakers.

A dynamic compression/limiting and peak normalization module 111 may also be provided to maximize the volume of the output file. Such a module solves the problem that, due to the wide variety of possible input files, a standard compressor/limiter with static settings will not always work correctly. To address this, the invention employs an adaptive compressor that analyzes the content of the audio and applies the proper amount of compression without destroying the file. Numerous compression algorithms are known, and any of these or others may be employed to accomplish this step.

A resampling module 113 may also be employed to change the sampling rate of the audio file to be output so as to meet the requirements of the audio CODEC of the mobile device. In the above example, a resampling operation may take the 16 bit, 44.1 kHz master and resample it given the bit depth and sampling rate parameters provided in the definition file.

One of the final steps of the audio transcoding operation is to encoding the file using the proper CODEC for the mobile device. This step is accomplished by a CODEC encoding module 115. Possible CODEC file types include MP3, QCELP (Qualcomm Code Excited Linear Predictive), AD-PCM (Adaptive Differential Pulse Code Modulation), AMR (Adaptive Multi-Rate), and AMR-WB (Adaptive Multi-Rate Wide Band). Other file types may also be employed.

Another of the final steps involves wrapper module 117. Many mobile formats are wrappers around underlying CODECs. For example, CMX 2.x files wrap QCELP as the underlying CODEC. The wrapper module 117 encapsulates the encoded data appropriately.

Another of the final steps may include the digital rights management (DRM) module 119. DRM is often applied as the last step to an audio transcoding operation. DRM can take many forms and generally restricts the distribution of the derivative file according to a set of rules.

A sample definition file is shown in FIG. 3. Some of the steps and modules above are also exhibited in FIG. 3.

The invention has been described with respect to certain embodiments. However, the scope of what is claimed as the invention is to be construed only by the appended claims.

What is claimed is:

1. A transcoding system, comprising:
    a definition file having instructions, the definition file converting a master file representing text, multipart, application, image, audio, graphics or video content, or any combinations thereof, using the instructions, to a derivative file, wherein the derivative file is defined by and is created via the definition file, and the derivative file provides a different representation of the master file and is appropriate for playback on a prespecified mobile handset, and wherein the content included in the derivative file is defined by the user of the system; and
    a plurality of modules controlled by the definition file that perform a corresponding plurality of functions on the master file to create the derivative file thereof.

2. The system of claim 1, wherein the definition file contains the plurality of modules.

3. The system of claim 1, wherein the master file includes at least one clip point.

4. The system of claim 3, wherein one of the modules is a clip negotiation module.

5. The system of claim 4, wherein the clip negotiation module has a maximum clip length parameter which determines the maximum length of the derivative file.

6. The system of claim 5, wherein the clip negotiation module has a maximum deviation from the maximum clip length parameter which determines how different the length of a resultant file can be from the maximum length.

7. The system of claim 1, wherein the modules are selected from the group consisting of: a channel averaging module, an equalization module, a dynamic compression module, a limiting and peak normalization module, a resampling module, a CODEC encoding module, a wrapper module, a digital rights management module, and combinations thereof.

8. The system of claim 1, wherein the master file is an audio file, and the derivative file is in the mp3 format.

9. The system of claim 1, wherein the master file is a two-channel .wav or .cda file encoded at 16 bits, 44.1 kHz.

10. A transcoding system, comprising:
    a definition file having instructions, the definition file converting a master file representing text, multipart, application, image, audio, graphics or video content, or any combinations thereof, using the instructions, to a derivative file, wherein the derivative file is defined by and is created via the definition file, and the derivative file provides a different representation of the master file and is appropriate for playback on a prespecified mobile handset, and wherein the content included in the derivative file is defined by the user of the system; and
    a plurality of modules controlled by the definition file that perform a corresponding plurality of functions on the master file to create the derivative file thereof, the plurality including:
        an equalization module;
        a dynamic compression module;
        a limiting and peak normalization module;
        a resampling module;
        a CODEC encoding module;
        a wrapper module;
        a digital rights management module;
        and combinations thereof.

11. The system of claim 10, wherein the CODEC encoding module codes for at least one of MP3, QCELP (Qualcomm Code Excited Linear Predictive), AD-PCM (Adaptive Differential Pulse Code Modulation), AMR (Adaptive Multi-Rate), and AMR-WB (Adaptive Multi-Rate Wide Band).

12. An audio transcoding system, comprising:
    a definition file having instructions, the definition file converting a master file representing text, multipart, application, image, audio, graphics or video content, or any combinations thereof, using the instructions, to a derivative file, wherein the derivative file is defined by and is created via the definition file, and the derivative file provides a different representation of the master file and is appropriate for playback on a prespecified mobile handset, and wherein the content included in the derivative file is defined by the user of the system, the master file containing at least one clip point; and
    a plurality of modules controlled by the definition file that perform a corresponding plurality of functions on the master file to create the derivative file thereof, the plurality including:
        a clip negotiation module;
        a channel averaging module;
        an equalization module;
        a dynamic compression module;
        a limiting and peak normalization module;
        a resampling module;
        a CODEC encoding module;
        a wrapper module;
        a digital rights management module;
        and combinations thereof.

13. The system of claim 12, wherein the CODEC encoding module codes for at least one of MP3, QCELP (Qualcomm Code Excited Linear Predictive), AD-PCM (Adaptive Differential Pulse Code Modulation), AMR (Adaptive Multi-Rate), and AMR-WB (Adaptive Multi-Rate Wide Band).

14. A method for transcoding a master file into at least one derivative file, comprising:
    accepting a master file representing text, multipart, application, image, audio, graphics or video content, or any combinations thereof;
    processing the master file with steps laid out in a definition file, the definition file providing instructions for converting the master file to a derivative file, the derivative file defined by and is created via the definition file, and the derivative file providing a different representation of the master file, appropriate for playback on a prespecified mobile handset, and wherein the content included in the derivative file is defined by the user of the system; and
    outputting the results of the processing step into the derivative file.

15. The method of claim 14, further comprising providing the derivative file to the mobile handset.

16. The method of claim 14, wherein the master file includes at least one clip point.

17. The method of claim 16, wherein the processing steps include clip negotiation.

18. The method of claim 17, wherein the clip negotiation step has a maximum clip length parameter which determines the maximum length of the derivative file.

19. The method of claim 18, wherein the clip negotiation step has a maximum deviation from the maximum clip length parameter which determines how different the length of a resultant file can be from the maximum length.

20. The method of claim 14, wherein the processing steps are selected from the group consisting of: channel averaging, equalization, dynamic compression, limiting and peak normalization, resampling, CODEC encoding, applying a wrapper, applying digital rights management, and combinations thereof.

21. The method of claim 14, wherein the derivative file is in the mp3 format.

22. The method of claim 14, wherein the master file is a two-channel .wav or .cda file encoded at 16 bits, 44.1 kHz.

23. A method for transcoding a master file into at least one derivative file, comprising:
   accepting a master file representing text, multipart, application, image, audio, graphics or video content, or any combinations thereof;
   processing the master file with steps laid out in a definition file, the definition file providing instructions for converting the master file to a derivative file, the derivative file defined by and is created via the definition file, and the derivative file providing a different representation of the master file, appropriate for playback on a prespecified mobile handset, and wherein the content included in the derivative file is defined by the user of the system, the steps including:
   applying equalization;
   applying dynamic compression;
   applying limiting and peak normalization;
   applying resampling;
   applying CODEC encoding;
   applying digital rights management; and
   outputting the results of the processing step into the derivative file.

24. The method of claim 23, wherein applying CODEC encoding applies encoding for at least one of MP3, QCELP (Qualcomm Code Excited Linear Predictive), AD-PCM (Adaptive Differential Pulse Code Modulation), AMR (Adaptive Multi-Rate), and AMR-WB (Adaptive Multi-Rate Wide Band).

25. A method for transcoding an audio master file into at least one derivative file, comprising:
   accepting an audio master file, representing text, multipart, application, image, audio, graphics or video content, or any combinations thereof, and having at least one clip point;
   processing the audio master file with steps laid out in a definition file, the definition file providing instructions for converting the audio master file to a derivative file, the derivative file defined by and is created via the definition file, and the derivative file providing a different representation of the master file, appropriate for playback on a prespecified mobile handset, and wherein the content included in the derivative file is defined by the user of the system, the steps including; and
   applying channel averaging;
   applying clip negotiation;
   applying equalization;
   applying dynamic compression;
   applying limiting and peak normalization;
   applying resampling;
   applying CODEC encoding;
   applying a wrapper;
   applying digital rights management; and
   outputting the results of the processing step into the derivative file.

26. The method of claim 25, wherein applying CODEC encoding applies encoding for at least one of MP3, QCELP (Qualcomm Code Excited Linear Predictive), AD-PCM (Adaptive Differential Pulse Code Modulation), AMR (Adaptive Multi-Rate), and AMR-WB (Adaptive Multi-Rate Wide Band).

27. A non-transitory computer-readable medium encoded with computer readable program code, the program code containing instructions for causing a computer to:
   accept a master file representing text, multipart, application, image, audio, graphics or video content, or any combinations thereof;
   process the master file with steps laid out in a definition file, the definition file providing instructions for converting the master file to a derivative file, the derivative file defined by and is created via the definition file, and the derivative file providing a different representation of the master file, appropriate for playback on a prespecified mobile handset, and wherein the content included in the derivative file is defined by the user of the system; and
   output the results of the processing step into the derivative file.

28. A method for transcoding a master file into at least one derivative file, comprising:
   accepting a master file representing text, multipart, application, image, audio, graphics or video content, or any combinations thereof;
   processing the master file with steps laid out in a definition file, the definition file providing instructions for converting the master file to a derivative file, the derivative file defined by and is created via the definition file, and the derivative file providing a different representation of the master file, appropriate for playback on a prespecified mobile handset, and wherein the content included in the derivative file is defined by the user of the system, the steps including:
   applying clip negotiation to choose at least one particular clip region for inclusion into the derivative file;
   applying zero or at least one processing steps;
   applying CODEC encoding; and
   outputting the results of the processing step into the derivative file.

* * * * *